United States Patent [19]
Kerr

[11] 3,934,038
[45] Jan. 20, 1976

[54] GLUTATHIONE COATED SHREDDED TRASH AS FISH FOOD

[75] Inventor: Donald M. Kerr, Philadelphia, Pa.

[73] Assignee: Total Disposal Systems, Inc., Fort Washington, Pa.

[22] Filed: Nov. 6, 1972

[21] Appl. No.: 304,297

[52] U.S. Cl. .................. 426/1; 426/2; 426/805; 426/304; 426/656; 426/512; 119/51 R; 195/65
[51] Int. Cl.² ........................................ A01K 67/00
[58] Field of Search ......... 426/1, 70, 212, 285, 302, 426/304, 342, 416, 420, 2, 512, 119; D1/1–4, 27, 99; 264/109, 128; 100/249, 295, 74, 117; 52/DIG. 9; 61/4; 424/84

[56] References Cited
UNITED STATES PATENTS

| 1,505,238 | 8/1924 | Ball | 61/4 |
|---|---|---|---|
| 2,069,715 | 2/1937 | Arpin | 61/4 |
| 3,115,864 | 12/1963 | Wagner | 426/1 |
| 3,330,088 | 7/1967 | Dunlea | 53/24 |
| 3,650,120 | 3/1972 | Harza | 100/249 |
| 3,653,216 | 4/1972 | Stickler | 61/4 |
| 3,721,183 | 3/1973 | Dunlea | 100/74 |
| 3,747,519 | 7/1973 | Capps | 100/295 |
| D221,723 | 9/1971 | Topalis | D1/2 |

OTHER PUBLICATIONS

Deep Ocean Dumping of Baled Refuse, NIPCC, Feb. 1971.
U.S. Gov't. Research and Development Reports, Vol. 70, Nov.–Dec. 1970, U.S. Dept. of Commerce.
Principles of Biochemistry, White, p. 172, McGraw–Hill, 1968, N.Y.

*Primary Examiner*—Norman Yudkoff
*Assistant Examiner*—Hiram H. Bernstein
*Attorney, Agent, or Firm*—Paul & Paul

[57] ABSTRACT

Shredded, separated trash from which a portion of recyclable materials have been retrieved and recycled back into industry, leaving only unusable waste material, is compressed into a bale having a density sufficient to cause the bale to immediately sink in salt water and having a shape causing it to remain at the spot on the ocean floor to which it has sunk, immovable by ocean currents. The bale is sprayed both inside and out with an organic material which serves as food for micro-organisms which use the sunken bales of trash as feeding stations.

1 Claim, 4 Drawing Figures

GLUTATHIONE COATED SHREDDED TRASH AS FISH FOOD

BACKGROUND OF THE INVENTION

This invention relates to the redevelopment of exhausted food sources from the very beginning of the ecological cycle, and more particularly, to a method and product utilizing waste materials not capable of being retrieved and recycled by the present state of the art, and adding to such unrecyclable materials a basic food substance attractice to and consumed by micro-organisms and sea worms.

In the prior art it is known to dump waste materials into the ocean at random, that is, the material is dumped over an area of the ocean or at a specific point and allowed to distribute itself with the ocean currents resulting in uncontrolled pollution. Further, the fishing of the ocean has been generally uncontrolled, resulting, in the case of the United States, in some half dozen or so over-fished areas along the eastern seaboard.

At the other end of the eco-cycle, trash has been accumulating and numerous methods have been developed for using it, re-cycling it and disposing of it. In this regard it is known to separate trash in its raw state, which is commonly known as refuse (a term which includes all putrescible and non-putrescible solid wastes, such as garbage, rubbish, and solid commercial and industrial wastes, but excluding human and animal intestinal wastes) and retrieve certain metals and paper products for recycling. The remainder of the trash is shredded in a process that reduces the trash by mechanical means to pieces about the size of a man's fingers. After shredding, the trash is separated and a majority portion of the total trash is retrieved and recycled back into existing industry. By an additional step it is known to bale the non-retrievable shredded trash in bales having a density on the order of 1890 pounds per cubic yard. The term "trash" is used in municipal codes and ordinances. Typically, and as used herein, it includes paper, wood, rags, rubber, plastics, metals, glass, house dust, yard trimmings, leather, oil, paints, furniture, ranges, refrigerators, tires, lumber, rugs, lamps and garbage. For an analysis of its chemical composition see "Chemical Analysis of Refuse Components", E. R. Kaiser, National Incinerator Conference, A.S.M.E., New York, 1966. The terms "municipal trash" or "municipal refuse" as used herein are intended to mean trash or refuse collected from municipalities for disposal.

Most substances dropped in the ocean will eventually disintegrate, but even organic substances such as wood may remain in a stable state for scores of years. The same is true, of course, for metals and the like. Thus, the indiscriminate dumping of raw trash into the ocean has made a transient junkyard out of the ocean floor.

At the start of the food production cycle, small micro-organisms feed on organic material. In turn these organisms are eaten by worms and the worms are eaten by fish, snails, mollusks and the like and these forms of small aquatic life are eaten by larger fish which serve as food for man. At the very bottom of the cycle the animal micro-organisms can be induced or attracted to feed on organic material containing glutathione.

In the prior art there are problems in disposing of trash, in controlling pollution and in starting the growth of animal organisms to serve as fish food in a controlled area on a large scale, so as to create an area in which fish can be harvested.

SUMMARY OF THE INVENTION

The present invention solves these problems by providing a product made in accordance with a process which combines shredded trash (more dense than sea water) as a substrate with an organic material suitable for attracting micro-organisms for feeding and growth development into baled products which are then deposited on the ocean floor to create fish feeding reefs. In accordance with the preferred embodiment in the invention, the shredded trash is sprayed as it passes through a hopper into a baling chamber. The spray comprises a material having most preferably glutathione as one of its elements. The sprayed trash is then baled by means of a specially formed plunger into a shape which will permit it to remain in its position on the ocean floor. The bale is sprayed again on its exterior before being deposited in the ocean, so that the organic film on the outside of the bale, as well as a substantial portion of the organic film on the individual pieces of the shredded trash, will be exposed to the water when the bale is immersed.

Accordingly, it is an object of this invention to provide a product for inducing the growth of animal organisms in selected areas of the sea and a method of producing that product most preferably from shredded trash.

It is another object of this invention to promote the growth of fish in the over-fished areas of the ocean.

These and other objects of the invention will become apparent from the following description with reference to the accompanying drawings.

BRIEF DESCRIPTION OF THE DRAWING

FIG. 1a is a schematic representation, partially in section, showing shredded trash being introduced into a hopper and baled to produce the product shown in perspective in FIG. 1b, which product is sprayed externally as shown schematically in the end view, FIG. 1c, and deposited to rest on the ocean floor as in FIG. 1d.

DESCRIPTION OF THE PREFERRED EMBODIMENT

Figure 1:
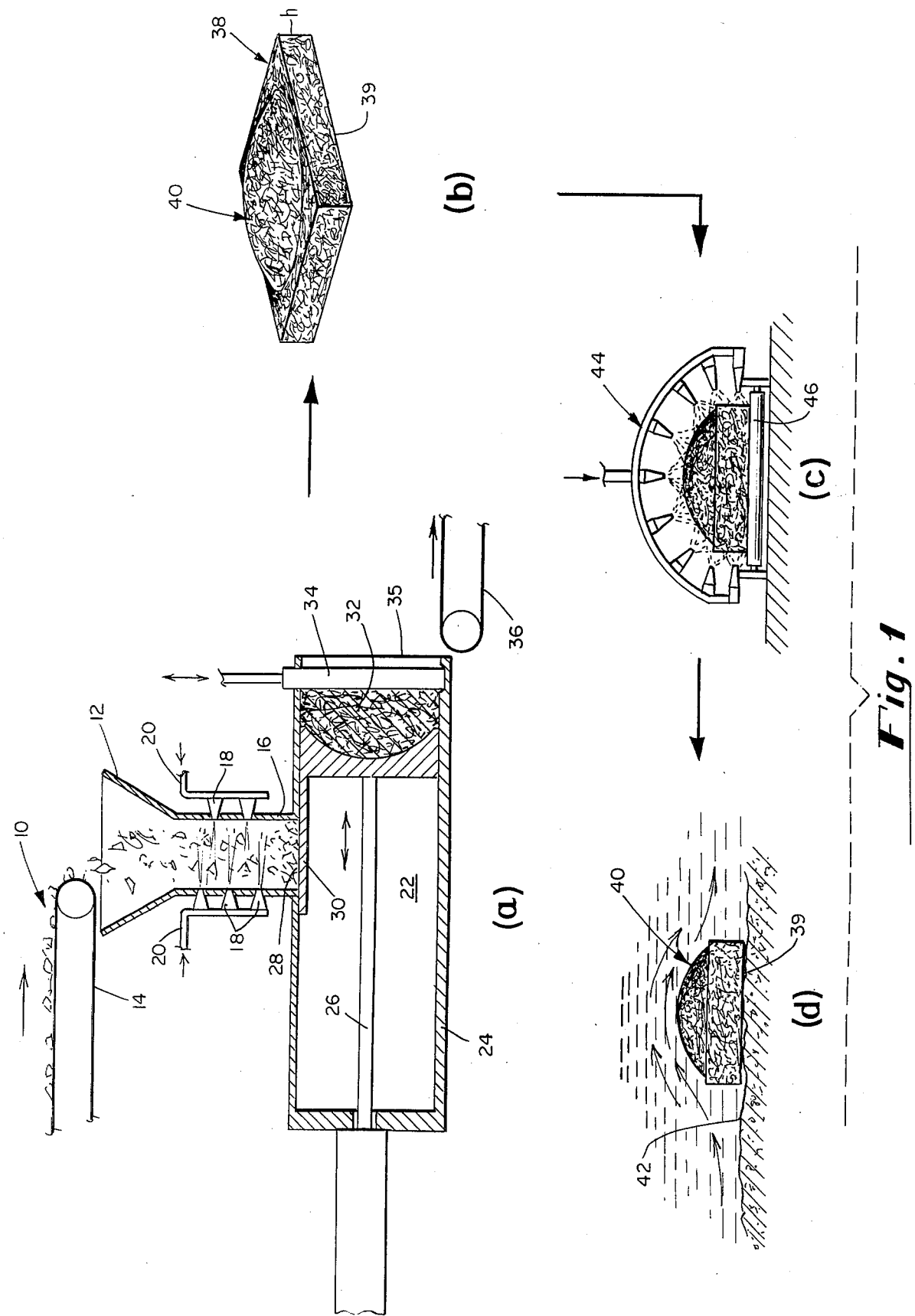
FIG. 1 shows in diagrammatic form the process in accordance with the preferred embodiment of this invention.

Although specific forms of the invention have been selected for illustration in the drawings, and the following description is drawn in specific terms for the purpose of describing these forms of the invention, this description is not intended to limit the scope of the invention which is defined in the appended claims.

Referring to FIG. 1, the shredded trash, as constituted in accordance with the foregoing description and designated generally 10, is conveyed toward a hopper 12 by means of an endless belt-type conveyor 14. The trash falls off the end of the belt into the hopper as shown in FIG. 1a. The trash falls by gravity through the cylindrical portion 16 of the hopper about which are mounted a plurality of spray nozzles 18 connected in any suitable manner to a source or sources (not shown) of liquid organic material by means of the headers 20; the material being fed through the headers in the direction shown by the arrows for spraying onto the pieces of shredded trash as shown by the lines in FIG. 1a. The liquid organic material is preferably a solution of glutathione (which is a substance found in the red blood cells of mammals and other warm-blooded invertebrates and has the property of inducing microorganisms to feed) and water in a suitable amount and proportion sufficient to coat a substantial portion of the individual particles of trash with an organic film.

As the material descends through the cylindrical chamber 16 it will fall into a baling chamber 22 in a baling machine shown schematically at 24. The plunger 26 of the baling machine is activated so that it moves back and forth in the direction of the double-headed arrows shown in FIG. 1a for baling and for receiving particles to be baled. When the plunger is retracted to the left, the opening 28 communicates with the chamber 22 and when the plunger 26 has been moved to the right (as shown in FIG. 1a) this opening is closed by the flange 30, and the material to be baled is compressed as at 32 against a retractable head 34. The head can move in the direction shown by the double-headed arrows, FIG. 1a, to open the end 35 of the baling chamber 22 and permit discharge of the bale, once it is formed, onto a conveyor belt 36. The belt is moving in the direction of the arrow and receives the finished bale shown in perspective in FIG. 1b, and designated generally 38.

A typical bale has overall dimensions along the large rectangular sides of the bases 39 of 30 inches by 40 inches and has a height $h$ of 6 inches. Within the rectangular borders shown, a semi-spherical portion is formed 6 inches high, designated generally 40. The semi-spherical portion is formed directly on and integral with the rectangular box-like base portion of the bale by the plunger 26 as shown in FIG. 1a. This configuration permits the bale to withstand the forces of the ocean currents which tend to move it from place to place on the floor of the ocean.

In FIG. 1d the bale is shown in position with the currents flowing over it. As will be noted, the bale rests on its rectangular bottom surface 39 on the floor 42 of the ocean. Tests have shown that if the bale is deposited on its upper semi-spherical surface 40 it would tend to roll over until it achieves the position shown in FIG. 1d. Once in this position, it tends to remain due to the fluid dynamic effects shown by the arrows, thus assuring locational stability.

Before depositing the bale in the ocean it is sprayed with the same organic material in solution as shown in FIG. 1c. The spraying device is a manifold with a plurality of heads designated generally 44, connected to a source (not shown) of fluid organic material. The spray is sufficient to place a coat or organic film on the outside of the bale over a substantial portion thereof. The bale is moved through the spray by means of the conveyor system including the roller 46.

The baling operation is such that, although the material is compressed to a high density, there are still passageways through the bale which will be filled with water when the bale is immersed. Thus, micro-organism growth is encouraged both on the outer surface of the bale and the surfaces of the individual particles.

Because of the structure, it is possible to accurately position these bales so as to form a reef in the ocean which will stay put, relatively speaking, once it is positioned. Because of the nature of the trash a large percentage of it will not break down immediately, such as, metal, glass, plastics, certain types of treated paper and wood. These materials may take years and even scores of years in which to deteriorate and, accordingly, they are relatively dimensionally stable, both in themselves and in their configuration with the other materials in the bale. As micro-organisms establish themselves in feeding on the organic film on the bale material, worms and the like will begin to feed on these organisms and various types of animal aquatic life will begin to feed on the worms. Therefore, these bales serve as a feeding station and support the development of a food chain from its very beginnings. By depositing the bales in reefs in overfished areas, it is possible to establish a food chain in these areas to encourage fish to frequent them and develop in them. Fish can then be harvested from such areas.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A method for disposing of shreaded municipal trash while at the same time utilizing said trash to provide food for fish, said method comprising:
   a. spraying the shreaded trash with a solution of glutathione;
   b. compressing the sprayed shreaded trash into a bale having a rectangular base configuration and a semi-spherical upper portion configuration;
   c. spraying the exterior surface of the bale with a solution of glutathione; and
   d. depositing said bale onto the ocean floor.

* * * * *